United States Patent Office 3,813,380
Patented May 28, 1974

3,813,380
CONTACT ADHESIVE MIXTURES
Eugen Bock, Leverkusen-Schlebusch, Manfred Dollhausen, Hitdorf, and Horst Muller-Albrecht, Cologne, Germany, assignors to Bayer Aktiengesellschaft, Leverkusen, Germany
No Drawing. Continuation of abandoned application Ser. No. 275,851, July 27, 1972. This application July 16, 1973, Ser. No. 379,501
Int. Cl. C08g 22/14, 22/26
U.S. Cl. 260—77.5 AP          1 Claim

ABSTRACT OF THE DISCLOSURE

Compositions suitable for use as contact or pressure-sensitive adhesives are provided which compositions are mixtures of a polyalkylene polyether polyol, a diisocyanatodiurethane and a catalyst which promotes the reaction between OH and NCO groups optionally with the inclusion of an aromatic diisocyanate and if desired in the presence of conventional additives such as, for example, pigments, fillers, and the like.

---

This is a continuation of application Ser. No. 275,851, filed July 27, 1972, and now abandoned.

This invention relates to solvent-free polyurethane contact adhesive compositions.

It is known that solvent-free contact adhesive compositions, also known as pressure-sensitive adhesives, can be produced from polyisocyanates and polyols. According to, for example, Belgian patent specification No. 762,588, a mixture of tolylene diisocyanate, a polyalkylene polyether polyol, and a tertiary amine is used for continuously coating flexible supporting materials.

One disadvantage of using a mixture of this kind is that processing it necessitates the use of expensive apparatus which has either to be enclosed or provided with an extremely effective extraction system, because serious damage to health can be caused by breathing tolylene diisocyanate vapors. If 4,4'-diisocyanato-diphenylmethane is used instead of tolylene diisocyanate for the production of solvent-free contact adhesive compositions, this compound, which is solid at normal room temperature, has to be fused in a complicated, time-consuming operation before it is mixed with the other components required. This results not only in undesirable secondary reactions, which can cause deterioration of the adhesive compositions, but also in damage in health attributable to the vapors given off.

It has now been found that it is possible to produce contact adhesive compositions exhibiting outstanding properties without any of the aforementioned disadvantages by using particular diisocyanatodiurethanes which are liquid at temperatures of about 20° C. and lower molecular weight polyalkylene polyether polyols in the presence of suitable catalysts. These contact adhesive compositions may be prepared simply by mixing the components in an open vessel at room temperature, without any need for expenditure on special apparatus.

Accordingly, the present invention relates to a mixture which comprises:

at least one polyalkylene polyether polyol having a molecular weight of from about 1,000 to about 10,000;
a diisocyanatodiurethane having the formula

OCN—R—NH—CO—O—R'—
                        O—CO—NH—R—NCO wherein
R represents a radical obtained by removing the isocyanate groups from an aromatic diisocyanate and
R' represents a radical obtained by removing the hydroxyl groups from a glycol or polyether glycol having a molecular weight of up to about 400; a catalyst which accelerates the OH/NCO-reaction; and, optionally, in the presence of an aromatic diisocyanate having the general formula

OCN—R—NCO wherein R is an aromatic radical; and, if desired, in the presence of other conventional aids and additives.

The invention also relates to the use of these mixtures for the production of contact adhesive layers.

The polyalkylene polyether polyol has a molecular weight of from about 1,000 to about 10,000, preferably from about 2,000 to about 6,000. These polyether polyols may be obtained by known methods, in which alkylene oxides are reacted with suitable starter molecules. Suitable starter molecules include, in particular, water and low molecular weight, polyhydric alcohols such as, for example, ethylene glycol, propylene glycol, butylene glycol, glycerol, trimethylol propane hexane triols and the like. Suitable alkylene oxides include, in particular, ethylene oxide, propylene oxide, butylene oxide and the like. Particularly preferred polyalkylene polyether polyols include polypropylene polyether polyols and, in particular, those of the kind described in Belgian patent specification No. 762,588 having from about 5% to about 25 mol percent (based on the total quantity of alkylene oxide) of terminal ethylene oxide units.

The diisocyanatodiurethanes are compounds having the general formula

OCN—R—NH—CO—O—R'—
                        O—CO—NH—R—NCO in which R and R' have the meanings given above.

Diisocyanatodiurethanes such as these may be obtained in a known manner by reacting at least about 2 mols of an aromatic diisocyanate with about 1 mol of a low molecular weight glycol. The diisocyanatodiurethanes are preferably obtained by gradually adding about 1 mol of the particular glycol to from about 2 to about 10 mols, preferably from about 4 to about 6 mols, of an aromatic diisocyanate. When more than about 2 mols of aromatic diisocyanate are used per mol of glycol, a mixture of the diisocyanatodiurethane and the excess of the particular aromatic diisocyanate is formed in situ.

Glycols having molecular weights of from about 62 to about 400 are particularly suitable for production of the diisocyanatodiurethanes. Examples of glycols such as these include ethylene glycol, propylene glycol, butylene glycol, 2,3-butane diol, diethylene glycol, triethylene glycol, tetraethylene glycol, pentaethylene glycol, dipropylene glycol, tripropylene glycol, tetrapropylene glycol, pentapropylene glycol, dibutylene glycol, tributylene glycol and the like. The corresponding polypropylene glycols, tripropylene glycol in particular, are preferably used.

Among the diisocyanates which can be used to produce the diisocyanatodiurethanes, 4,4' - diisocyanatodiphenylmethane and its isomers are particularly suitable.

The reaction product of from about 4 to about 6 mols of diisocyanatodiphenylmethane with about 1 mol of polypropylene glycol, tripropylene glycol in particular, is distinguished by its particularly favorable processing properties. Accordingly, the reaction product comprises a mixture of from about 1 mol of diisocyanatodiurethane and from about 2 to about 4 mols of excess 4,4'-diisocyanatodiphenylmethane.

To prepare the mixtures according to the invention, the polyether component, comprising one or more polyethers is mixed with such a quantity of the diisocyanate component that an NCO/OH ratio of from about 0.5:1 to 1.5:1, preferably from 0.7:1 to 1.3:1 is obtained.

Catalysts suitable for the mixtures according to the invention include any compounds which accelerate the NCO/OH reaction, especially tertiary amines, for example, 1,4-diazabicyclo[2.2.2]octane or organometallic compounds, especially tin compounds, for example, dibutyl tin dilaurate. The catalyst is used in a quantity of from about 0.01% to about 5% by weight, preferably in a quantity of from about 0.1% to about 2% by weight, based on the total quantity of starting materials.

Immediately after mixing, and for a while afterwards, the contact adhesive composition has a relatively low viscosity and can readily be applied to the materials to be bonded, for example, paper, textiles, plastics, rubber, metal or ceramic materials, with a simple tool, for example, a brush or a doctor knife. Thereafter, it hardens and reaches its maximum bond strength.

Natural or synthetic resins, antiagers, pigments and fillers can, of course, be added as desired.

The invention is further illustrated but it is not intended that it be limited by the following examples in which all parts and percentages are by weight unless otherwise indicated.

EXAMPLES

Example 1

About 68.80 parts of a 1,2-propane diol-initiated polypropylene ether diol containing about 10.2 mol percent terminal ethylene oxide units and a hydroxyl number of about 28.0;

About 31.20 parts of trimethylol propane-initiated polypropylene ether triol containing about 9.2 mol percent terminal ethylene oxide units and a hydroxyl number of about 39.0;

About 12.75 parts of a diisocyanatodiurethane obtained by reacting about 5 mols of 4,4'-diisocyanatodiphenylmethane with about 1 mol of tripropylene glycol, and About 0.50 parts of 1,4-diazabicyclo[2.2.2]octane are stirred together at 20° C. and applied with a doctor knife to a 50µ thick Hostaphan film to obtain a uniform layer about 100µ thick.

To assess bond strength in accordance with DIN 40,633, Sheet 1, the coated Hostaphan film is cut into strips about 15 mm. wide. After storage for about 24 hours at about 20° C., these strips are applied to sheets of stainless steel (X12.Cr Ni 188, material number 14300 according to DIN 17,440), roughened with 280-grade emery paper, under the pressure of a steel roller of 2 kg./cm. strip width. The ends of the strips are bent back through 180° and pulled off at a rate of about 300 mm. per minute. The bond strength is 980 p./cm.

Example 2

About 68.80 parts of a 1,2-propane diol-initiated polypropylene ether diol containing about 10.2 mol percent terminal ethylene oxide units and a hydroxyl number of about 28.0.

About 31.20 parts of a trimethylol propane-initiated polypropylene ether triol containing about 9.2 mol percent terminal ethylene oxide units and a hydroxyl number of about 39.0;

About 12.75 parts of a diisocyanatodiurethane, obtained by reacting about 5 mols of 4,4'-diisocyanatodiphenylmethane with about 1 mol of tripropylene glycol; and About 2.00 parts of dibutyl tin diluarate are stirred together at 20° C. applied to a Hostaphan film, and tested as in Example 1. The bond strength is 860 p./cm.

Example 3

About 100.00 parts of a trimethylol propane-initiated polypropylene ether triol containing about 9.2 mol percent terminal ethylene oxide units and a hydroxyl number of about 39.0;

About 7.98 parts of a diisocyanatodiurethane obtained by reacting about 5 mols of 4,4'-diisocyanatodiphenylmethane with about 1 mol of tripropylene glycol; and About 0.50 parts of 1,4-diazabicyclo[2.2.2]octane were stirred together at 20° C., applied to a Hostaphan film and tested as in Example 1. The bond strength is 480 p./cm.

Although the invention is illustrated in considerable detail, in the foregoing examples, it is to be understood that such examples are presented solely for purposes of illustration and that many variations may be made by those skilled in the art without departing from the spirit and scope of the invention.

What is claimed is:

1. Contact adhesives prepared by a process which comprises mixing
   (a) a polyalkylene polyether polyol having a molecular weight of from about 2000 to about 6000 and having from about 5 to about 25 mol percent based on the total quantity of alkylene oxide of terminal ethylene oxide units and
   (b) a diisocyanatodiurethane having the formula

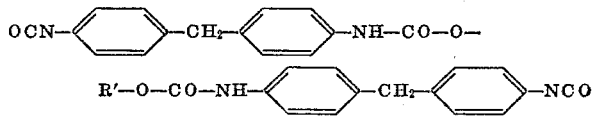

wherein R' is a radical obtained by removing the hydroxyl groups from a polypropylene glycol having a molecular weight of up to about 400 and 4,4'-diisocyanatodiphenylmethane, the molar ratio of diisocyanatodiurethane to diisocyanatodiphenylmethane being from about 1:2 to about 1:4, the amount of the reactants being such that the NCO/OH ratio is from about 0.7:1 to about 1.3:1 based on the total quantity of NCO groups contained in the diisocyanatodiurethane and the diisocyanatodiphenylmethane and the hydroxy groups of the polyether polyol and applying the mixture as long as it is still readily applicable to a suitable substrate.

References Cited

UNITED STATES PATENTS

| | | | |
|---|---|---|---|
| 3,309,261 | 3/1967 | Schiller et al. | 161—190 |
| 3,590,411 | 7/1971 | Zemlin | 12—146 D |
| 3,663,513 | 5/1972 | Kazama et al. | 260—75 NT |

OTHER REFERENCES

Saunders et al., Polyurethanes, Part II, Interscience, N.Y., 1964, pp. 611 & 612.

MAURICE J. WELSH, JR., Primary Examiner

U.S. Cl. X.R.

156—331; 260—77.5 AT

UNITED STATES PATENT AND TRADEMARK OFFICE
CERTIFICATE OF CORRECTION

PATENT NO. : 3,813,380

DATED : May 28, 1974

INVENTOR(S) : Eugen Bock; Manfred Dollhausen; Horst Muller-Albrecht

It is certified that error appears in the above-identified patent and that said Letters Patent are hereby corrected as shown below:

Column 1, line 9, insert --Claims priority application Germany August 7, 1971, P 21 39 640.7--

Column 3, line 42, correct "40,633" so that it reads --40 633--; same column, line 46, correct "17,440" so that it reads -- 17 440 --;

Column 4, line 1, insert a comma after "20°C."

Signed and Sealed this ninth Day of March 1976

[SEAL]

Attest:

RUTH C. MASON
Attesting Officer

C. MARSHALL DANN
Commissioner of Patents and Trademarks